(12) United States Patent
Cheng (10) Patent No.: US 8,113,534 B2
(45) Date of Patent: Feb. 14, 2012

(54) SAFETY BUCKLE STRUCTURE OF BABY STROLLER

(76) Inventor: Pao-Hsien Cheng, Tainan Hsien (TW)

( * ) Notice: Subject to any disclaimer, the term of this patent is extended or adjusted under 35 U.S.C. 154(b) by 358 days.

(21) Appl. No.: 12/461,838

(22) Filed: Aug. 26, 2009

(65) Prior Publication Data
US 2011/0049842 A1 Mar. 3, 2011

(51) Int. Cl.
*B62B 1/00* (2006.01)
(52) U.S. Cl. .......................... 280/649; 280/642
(58) Field of Classification Search .................. 280/642, 280/647, 648, 649, 650
See application file for complete search history.

(56) References Cited

U.S. PATENT DOCUMENTS

| | | | | |
|---|---|---|---|---|
| 4,111,454 A | * | 9/1978 | Kassai | 280/649 |
| 4,232,897 A | * | 11/1980 | Maclaren et al. | 297/45 |
| 4,648,651 A | * | 3/1987 | Hawkes | 297/45 |
| 4,986,564 A | * | 1/1991 | Liu | 280/642 |
| 5,288,098 A | * | 2/1994 | Shamie | 280/642 |
| 6,811,178 B2 | * | 11/2004 | Tomasi et al. | 280/650 |
| 7,108,275 B2 | * | 9/2006 | Yeh et al. | 280/647 |
| 7,267,358 B2 | * | 9/2007 | Chen | 280/642 |
| 7,434,827 B2 | * | 10/2008 | Yeh et al. | 280/642 |
| 7,918,467 B2 | * | 4/2011 | Cheng | 280/38 |
| 2006/0131841 A1 | * | 6/2006 | Huang | 280/647 |
| 2007/0013167 A1 | * | 1/2007 | Henry | 280/642 |
| 2008/0143082 A1 | * | 6/2008 | Chen et al. | 280/650 |

* cited by examiner

Primary Examiner — J. Allen Shriver, III
Assistant Examiner — James M Dolak
(74) Attorney, Agent, or Firm — Rosenberg, Klein & Lee (57) ABSTRACT

This invention relates to a safety buckle structure of baby stroller which shows a collapsible stand provided between rear wheels thereof, a main rod being provided at the central portion of a main joint of the collapsible stand, two upper rods being pivoted at the top end of the main rod and to the corresponding rear wheel rods at the other ends thereof, two lower rods being pivoted at the bottom end of the main rod and to the corresponding rear wheel rods at the other ends, a buckling means being pivoted at the pivot of the bottom end of the main rod and the lower rods, the main rod and lower rods are inserted and fixed in the buckling means. Thus, the front and rear wheel rods can be moved closely to the center to shrink the volume thereof as small as possible for facilitating assembly, storage or transportation.

11 Claims, 8 Drawing Sheets

SAFETY BUCKLE STRUCTURE OF BABY STROLLER

BACKGROUND OF THE INVENTION

1. Field of the Invention

The present invention relates to a safety buckle structure of baby stroller, particularly to a safety buckle structure of baby stroller in which the front-wheel rods and the rear-wheel rods are moved closely to the center and collapsed.

2. Brief Description of the Prior Art

Conventional baby stroller has a plurality of leg provided on the stroller body and a hole is provided for each leg at side wall close to the bottom end, thread fastening members inserted through the holes respectively being used to fix a plurality of caster on the legs after the connecting rods of the casters being connected to the bottom ends of the legs. In this manner, the stroller body can be moved easily.

However, the above baby stroller is found to have the following disadvantages in practical implementation.

1. The above baby stroller is to fix a caster on the bottom end of each leg of the stroller body by means of a thread fastening member. AS each leg and each caster is to be stored and transported in separated state, the thread fastening members have to be threaded for fixing one by one when assembling is needed. This will cause inconvenience and troublesome of the maker as well as the concerned supplier.

2. As there is a bulk volume of above baby stroller after assembly, huge space is required so that storage and transportation of baby stroller becomes unfavorable to both maker and user.

SUMMARY OF THE INVENTION

In view of the above disadvantages, the object of the present invention is to provide a safety buckle structure of baby stroller by which the volume of the stroller body can be shrunk to a minimum value so as to facilitate assembling, storage or transportation thereof.

A preferred embodiment of the safety buckle structure of baby stroller of the present invention is characterized in that it essentially comprises a stroller body having a plurality of front-wheel rod and a plurality of rear-wheel rod pivotally connected together, a collapsible stand being provided between two rear wheels of a stroller body, the collapsible stand having a main joint the bottom end of which has middle rods pivotally connected at two sides respectively, a main rod being provided at the central portion of a main joint, two upper rods stretching out laterally being pivotally connected at the top end of the main rod and the other ends of the upper rods being pivotally connected to the corresponding rear-wheel rods respectively, two lower rods stretching out laterally being pivotally connected at the bottom end of the main rod and the other ends of the lower rods being pivotally connected to the corresponding rear-wheel rods respectively, a buckling means being pivotally connected at the pivot of both the bottom end of the main rod and the lower rods, the main rod of the collapsible stand being inserted and fixed in the buckling means and the lower rods being inserted and fixed at two sides of the buckling means respectively, a stop portion being formed on the bottom end of the buckling means for arresting the main rod and each lower rod.

DETAILED DESCRIPTION OF PREFERRED EMBODIMENTS

The objects, the technical contents and the expected effectiveness of the present invention will become more apparent from the detailed description of the preferred embodiment in conjunction with the accompanying drawings.

Figure 1:
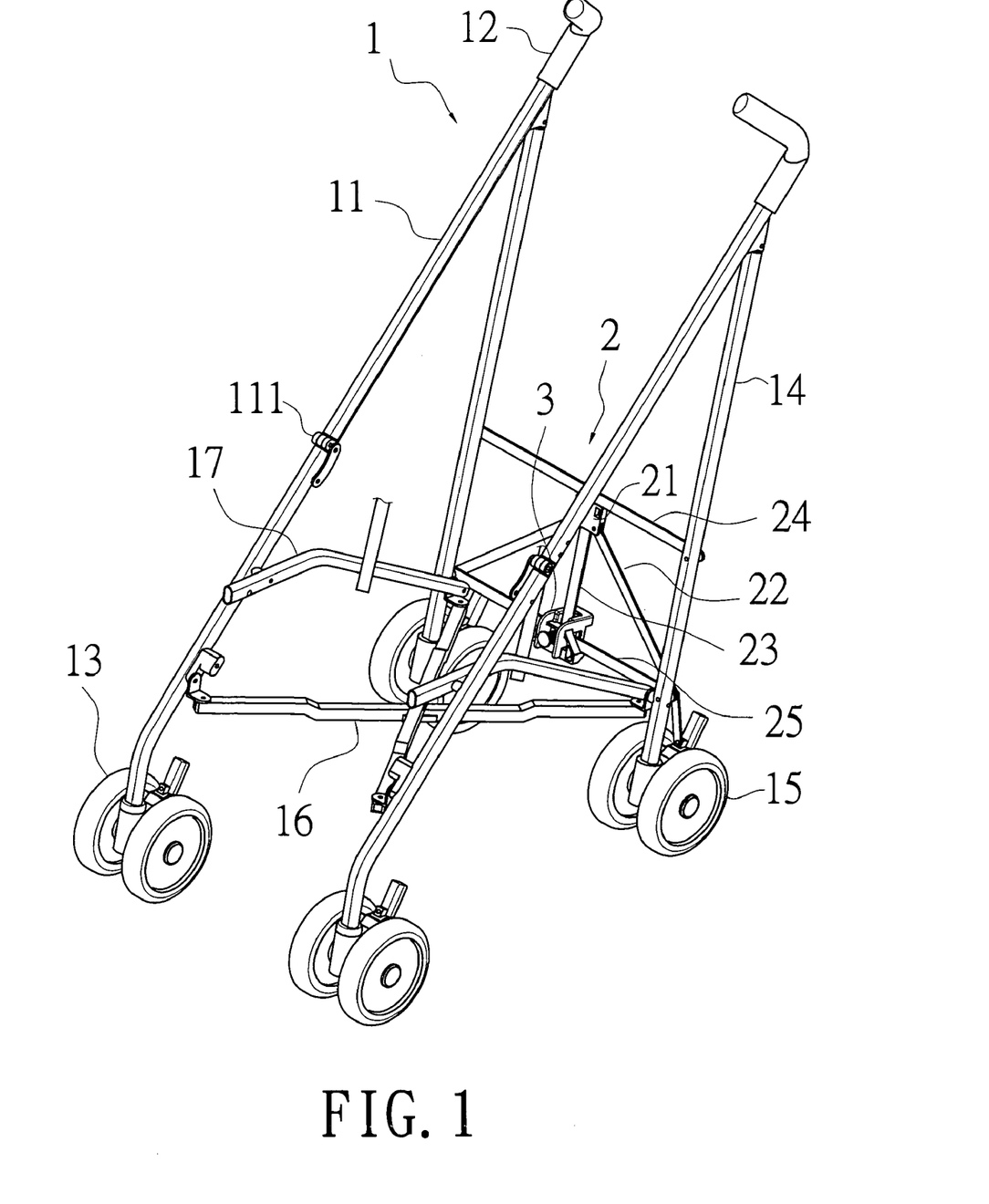
FIG. 1 is a perspective view showing the unfolded state of the baby stroller of the present invention.

Firstly referring to FIG. 1, the safety buckling structure of baby stroller of the present invention comprises a stroller body (1), a collapsible stand (2) and a buckling means (3).

The stroller body (1) has a plurality of front-wheel rod (11), the upper and the lower ends of each front-wheel rod (11) have a grip (12) and a front wheel (13). A front-wheel rod joint (111) is provided at the middle section of each front-wheel rod (11), and a rear-wheel rod (14) is pivotally connected below the grip (12) of each front-wheel rod (11). A rear wheel (15) is provided on the bottom end of each rear-wheel rod (14). An intersection frame (16) is pivotally connected above the front wheel (13) of each front-wheel rod (11) and above the rear wheel (15) of each rear-wheel rod (14) so as to limit the open angle of each front-wheel rod (11) and each rear-wheel rod (14). A lateral rod (17) is pivotally connected below the front-wheel rod joint (111) of each front-wheel rod (11) and is near the intersection frame (16). Another end of each lateral rod (17) is pivotally connected above the rear wheel (15) on the corresponding rear-wheel rod (14) so as to limit the open angle of each front-wheel rod (11) and each rear-wheel rod (14).

Figure 2:
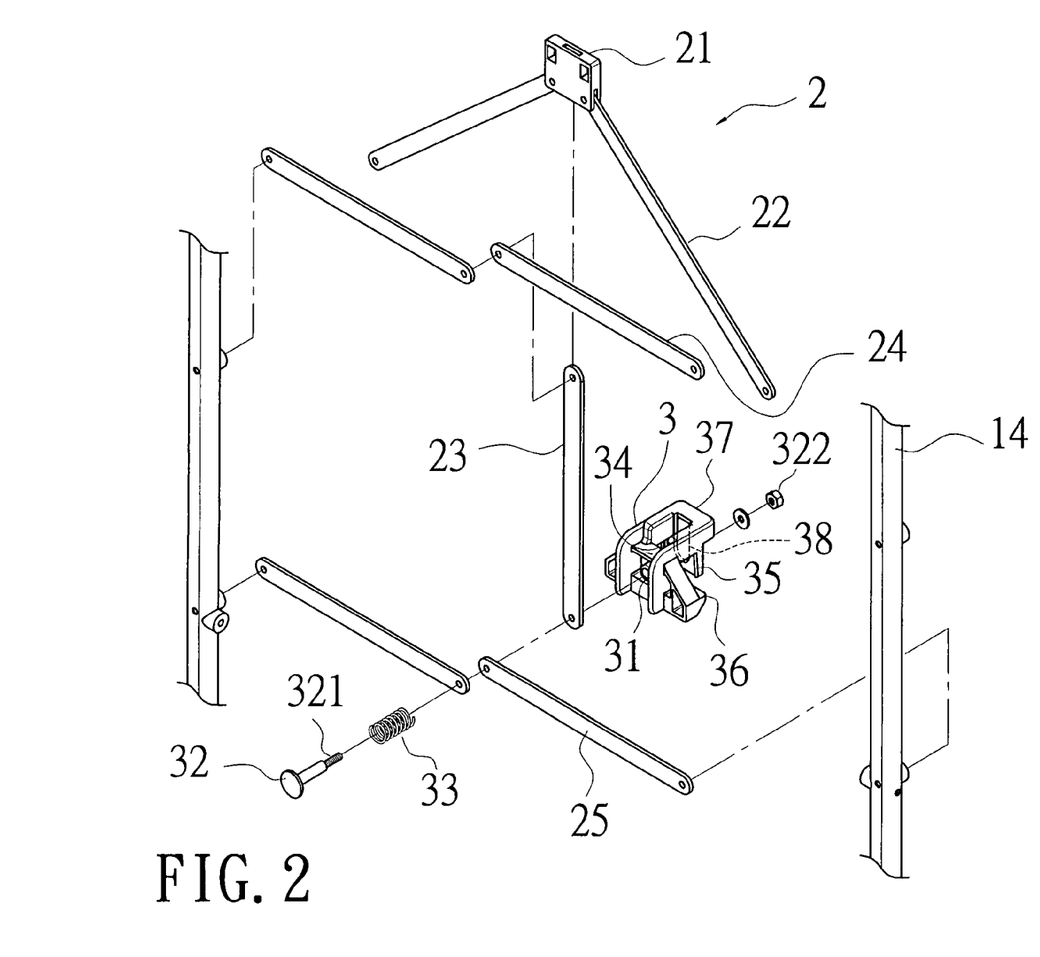
FIG. 2 is a perspective exploded view showing the collapsible stand and the buckling means of the present invention.
Figure 3:
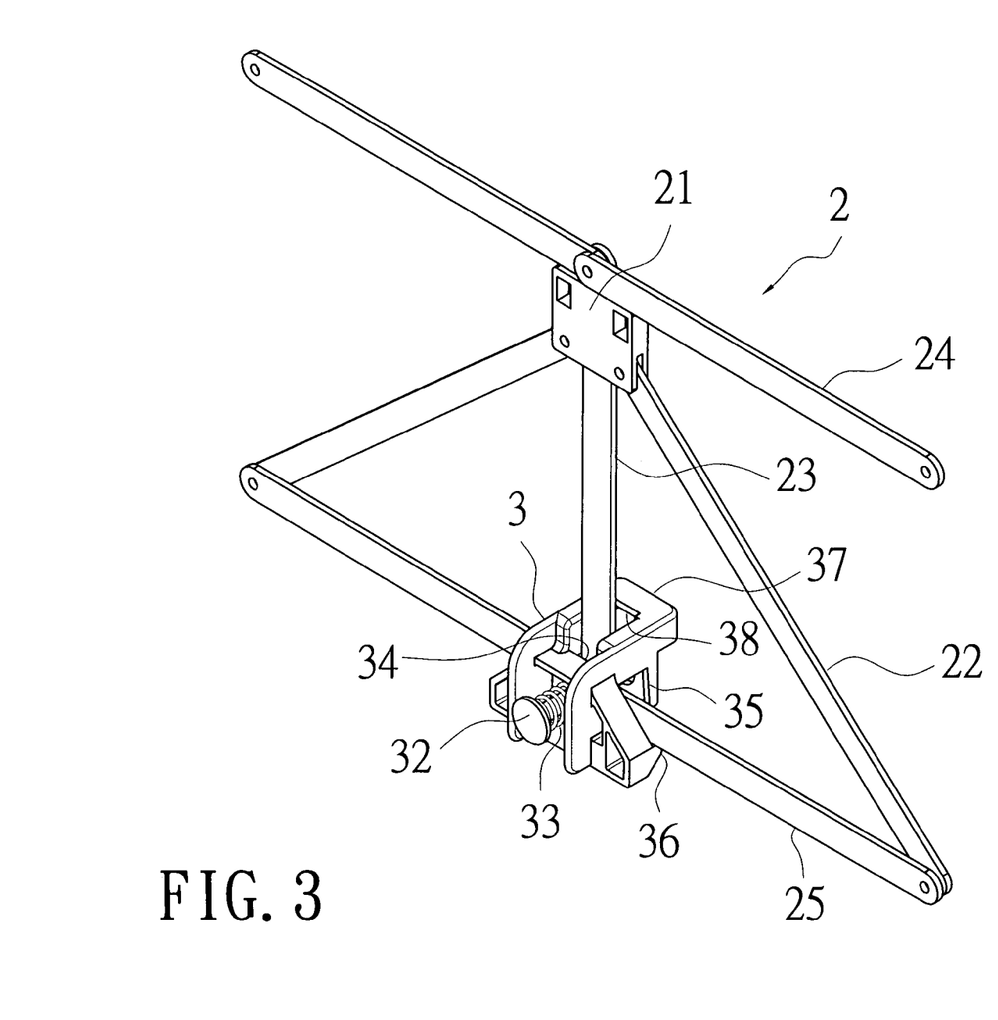
FIG. 3 is a perspective assembled view showing the collapsible stand and the buckling means of the present invention.
Figure 4:
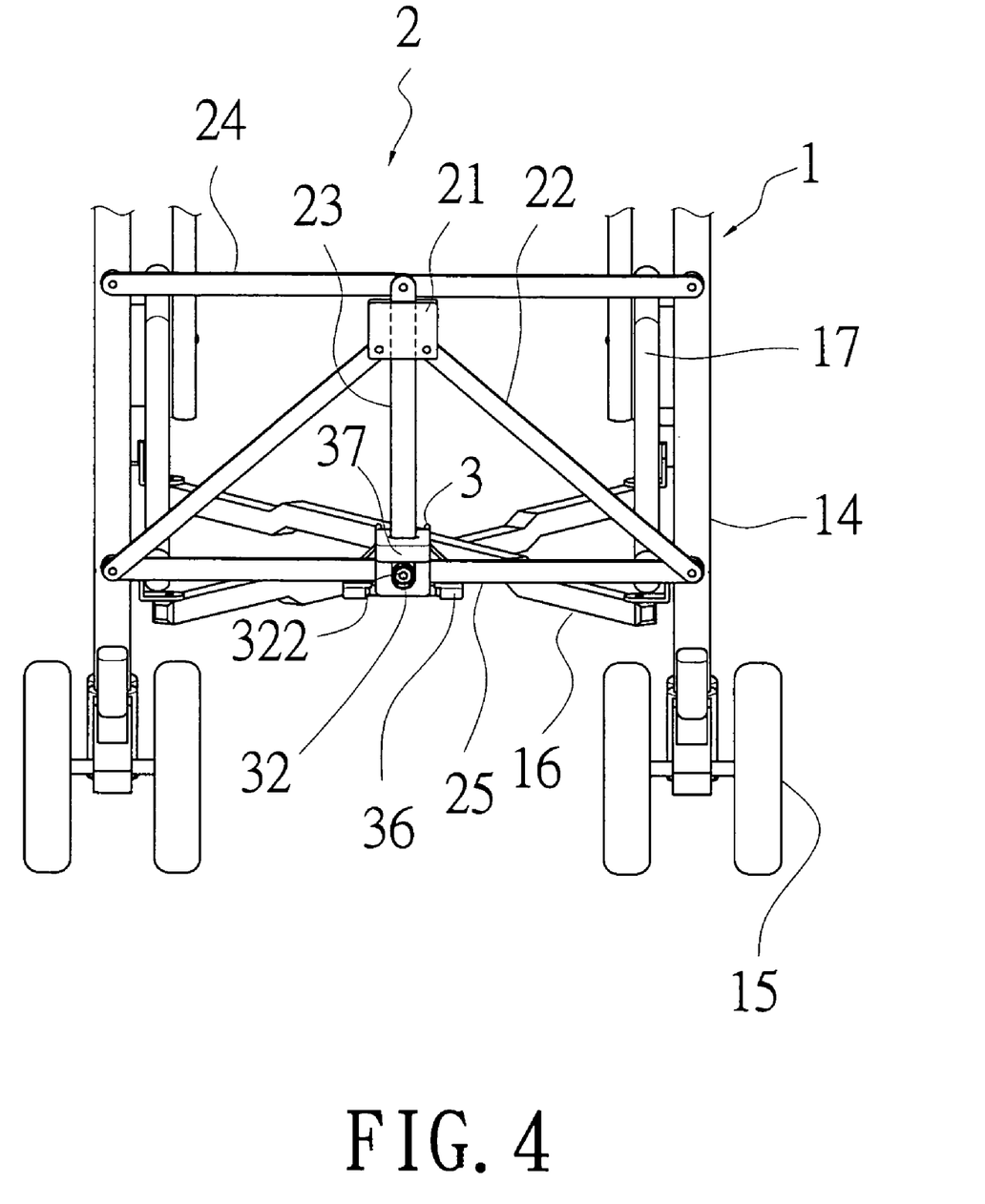
FIG. 4 is a rear view showing the interlocked state of the collapsible stand and the buckling means of the present invention.
Figure 5:
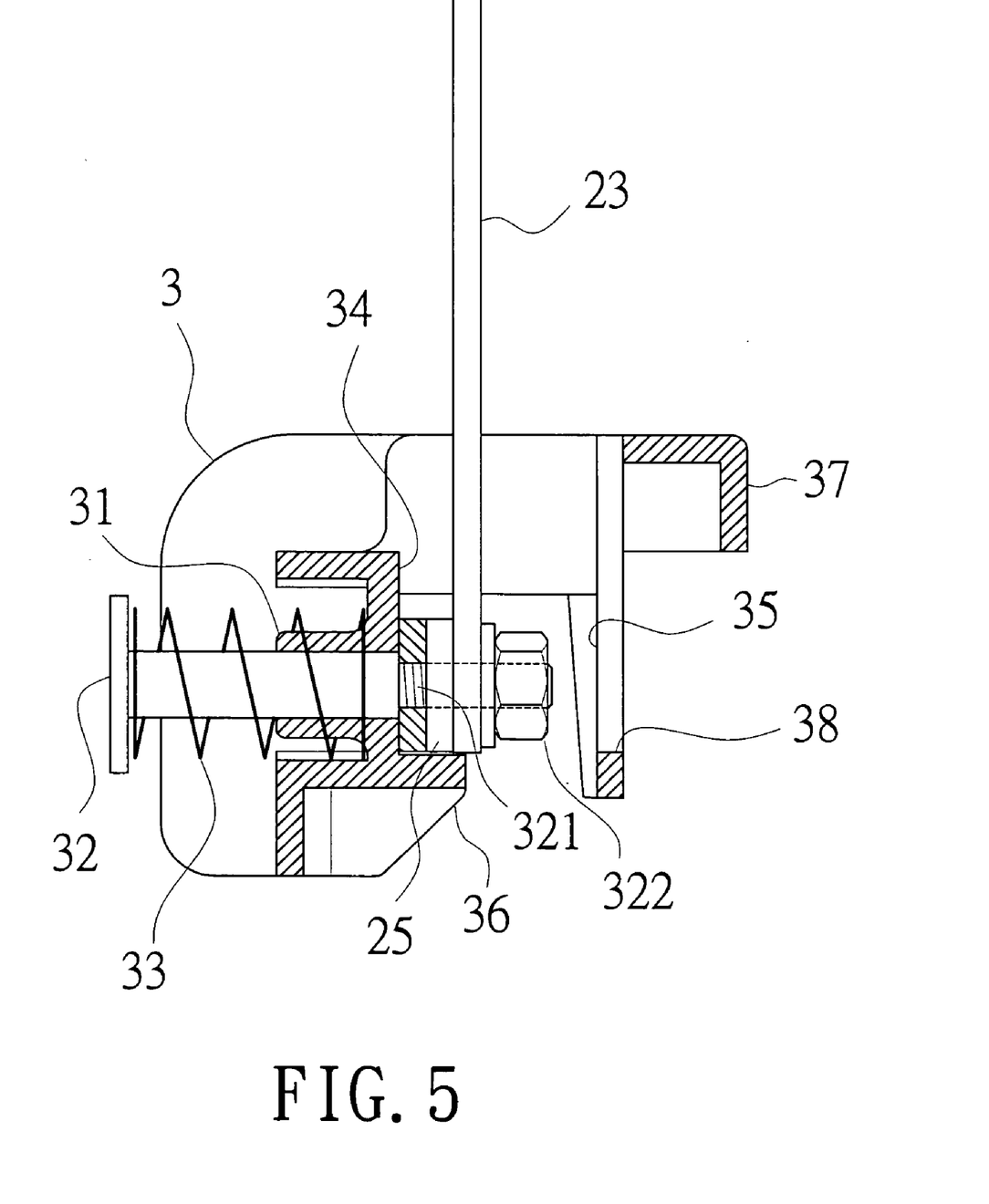
FIG. 5 is a side view showing the interlocked state of the collapsible stand and the buckling means of the present invention.

The collapsible stand (2) has a main joint (21), as shown in FIGS. 2 and 3, the bottom end of which has middle rods (22) pivotally connected at two sides respectively. A main rod (23) is inserted at the central portion of the main joint (21), and two upper rods (24) stretching out laterally to respective side are pivotally connected at the top end of the main rod (23) so that the top end of the main rod (23) is arrested at the upper side of the main joint (21) to avoid coming off. Also, two lower rods (25) stretching out laterally to respective side are pivotally connected at the bottom end of the main rod (23), and the other end of each middle lateral rod (22) is pivotally connected to the other end of the corresponding lower rod (25).

A female joint portion (31) is formed on the front side of the buckling means (3), as shown in FIGS. 2 and 3, and a binding screw (32) is inserted through the female joint portion (31). An elastic member (33) is clamped between the binding screw (32) and the female joint portion (31). A through groove (34) is formed at the top end of the rear side of the buckling means (3) for the passing and installation of the main rod (23) of the collapsible stand (2), and lateral grooves (35) with respect to the through groove (34) for the passing and installation of each lower rod (25) of the collapsible stand (2) are formed respectively at both sides of the buckling means (3). Stop portions (36) with respect to the through grooves (34) for arresting the main rod (23) and each lower rod (25) are formed at the bottom end of the buckling means (3). An outer thread portion (321) is formed at the rear end of the binding screw (32) for engagement with a thread nut (322) so as to make the main rod (23) and each lower rod (25) to be connected pivotally. A force-applying portion (37) is formed at rear side of the buckling means (3) and a hole (38) with respect to the binding screw (32) is provided below the force-applying portion (37).

In assembling process, referring to FIG. 1, FIG. 3 to 5, the main rod (23) of the collapsible stand (2) is inserted from the through groove (34) of the rear side of the buckling means (3), while the lower rods (25) are inserted from the lateral grooves (35) respectively at both sides of the buckling means (3). Then, the binding screw (32) is inserted through the common pivotal end of the main rod (23) and each lower rod (25) and is locked by a thread nut (322) such that the main rod (23) and each lower rod (25) are pivotally connected at rear end of the binding screw (32) and are stopped above the stop portions (36). Then, the collapsible stand (2) with the buckling means (3) together are pivotally connected to each rear-wheel rod (14) of the stroller body (1) by the upper rods (24), the middle rods (22) and the lower rods (25) at both sides so that the stroller body (1) is formed into an unfolded state. The folded and unfolded state of the stroller body (1) can be controlled by the collapsible stand (2) and the buckling means (3).

Figure 6:
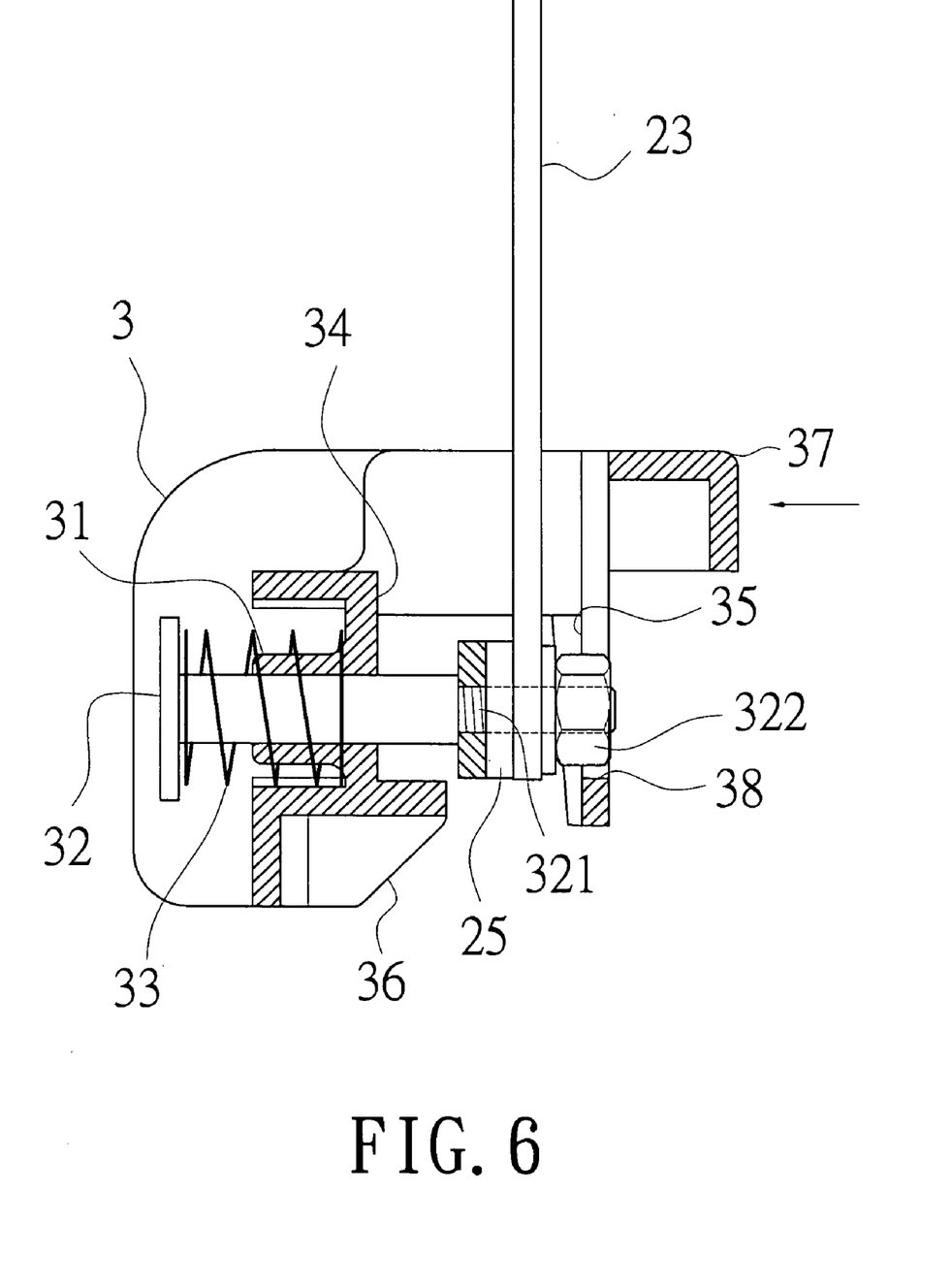
FIG. 6 is a side view showing the separated state of the collapsible stand and the buckling means of the present invention.
Figure 7:
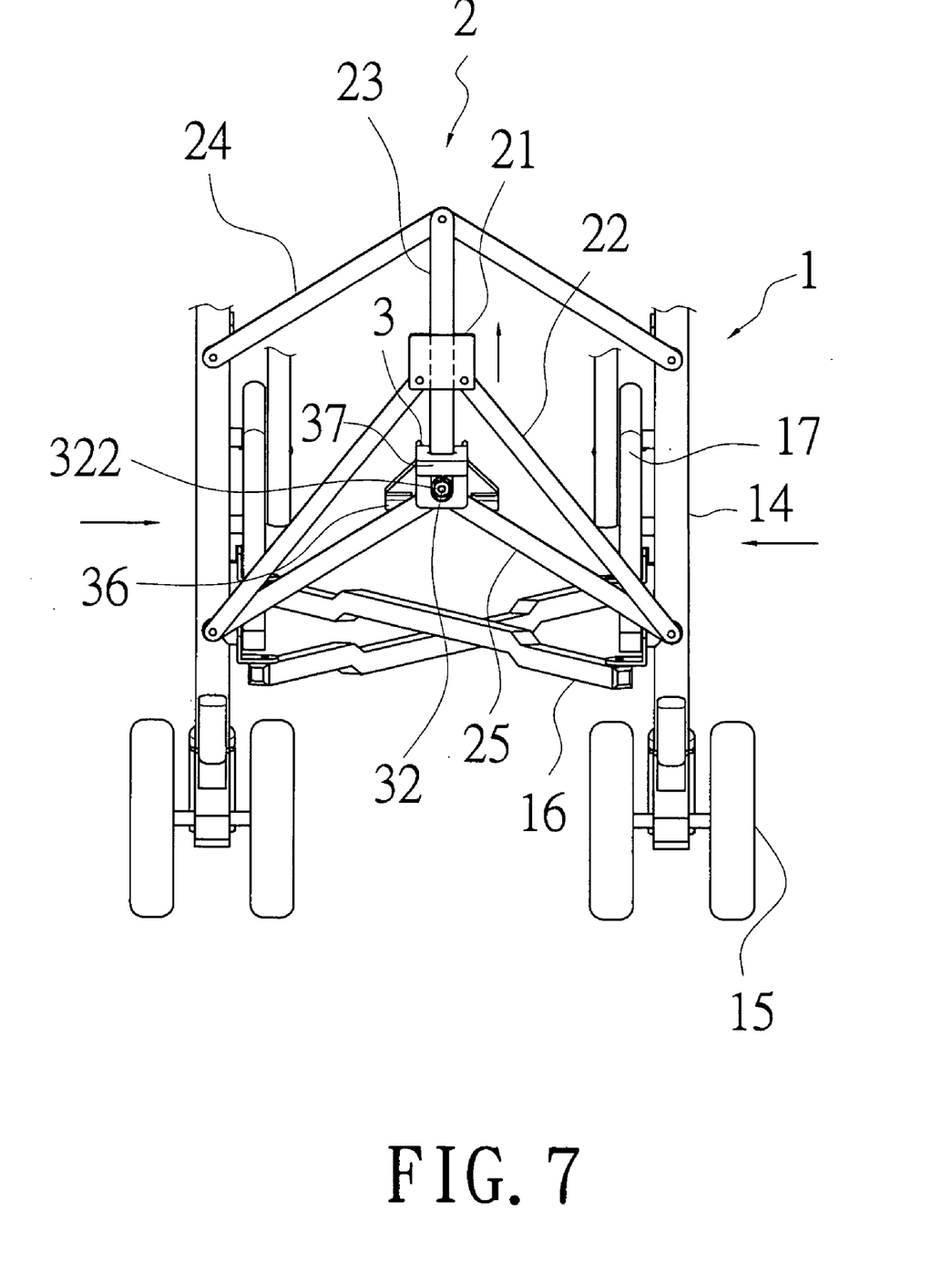
FIG. 7 is a rear view showing the separated state of the collapsible stand and the buckling means of the present invention.
Figure 8:
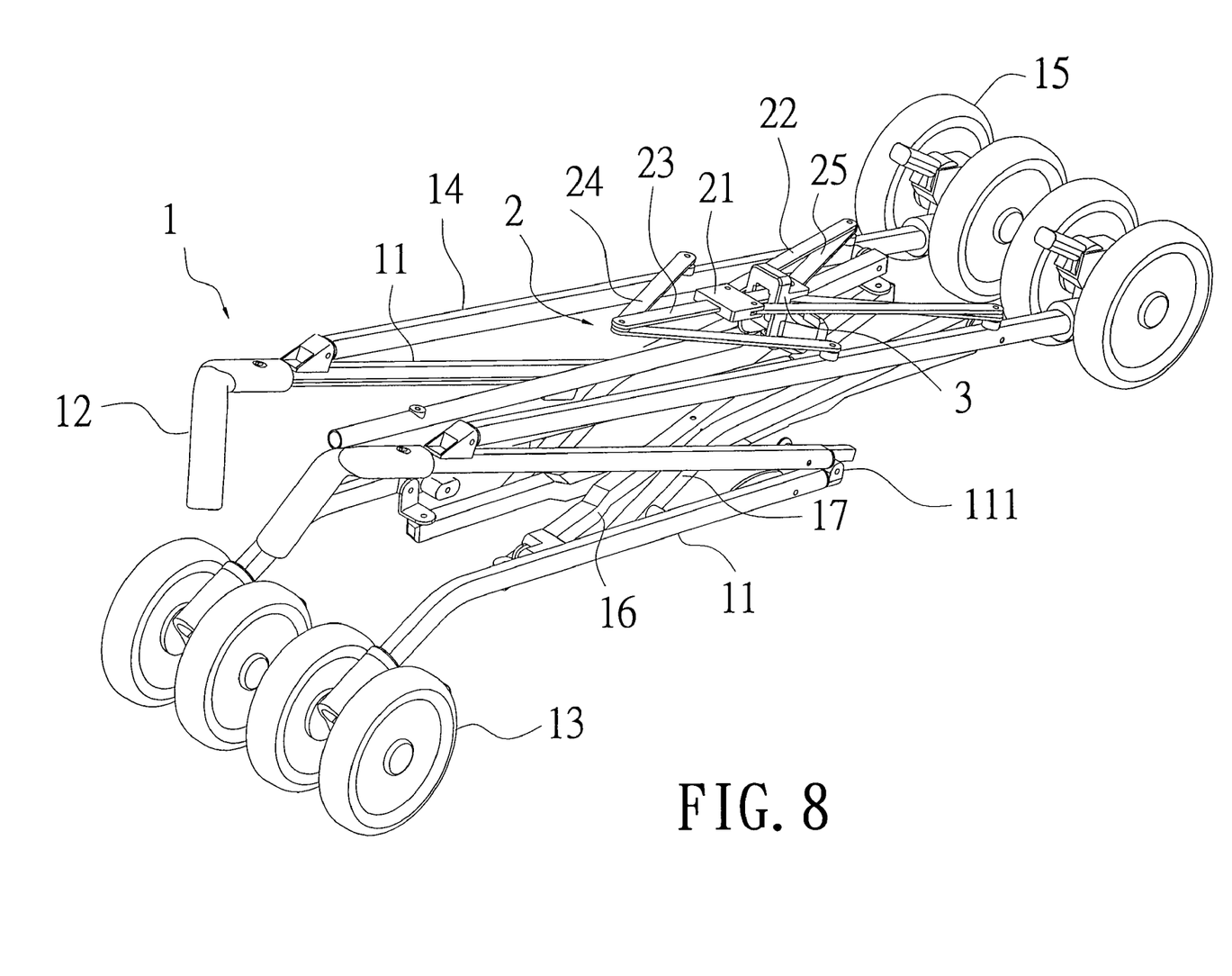
FIG. 8 is a perspective view showing the collapsed state of the baby stroller of the present invention.

In the conduction of shrinking, referring to FIG. 6, a force is firstly applied to the force-applying portion (37) at rear side of the buckling means (3) so that the buckling means (3) is moved forward relative to the binding screw (32). Then, the main rod (23) and each lower rod (25) are no more stopped above the stop portion (36) of the buckling means (3). As shown in FIGS. 7 and 8, the collapsible stand (2) can be pushed upwardly to fold the upper rods (24), the middle rods (22) and the lower rods (25), and the front-wheel rods (11) and the rear-wheel rods (14) at both side of the stroller body (1) are moved closely to the center. Simultaneously, the intersection frame (16) at the bottom of the stroller body (1) is also collapsed, and each front-wheel rod (11) is doubled up at the front-wheel rod joint (111) on the middle section. In this manner, the volume of the stroller body (1) can be shrunk to a minimum value so as to facilitate assembly, storage or transportation.

It is understood from the above description based on the structure and the preferred embodiment, the present invention has the following advantages when comparing with conventional art.

1. This invention has a collapsible stand and a buckling means provided on the rear-wheel rods, which can move the front-wheel rods and the rear-wheel rods closely to the center so as to shrink the volume of the stroller body to a minimum value. In this manner, the purpose of facilitating the assembly, storage or transportation can be achieved.

2. When the front-wheel rods and the rear-wheel rods of the stroller body of the present invention are unfolded laterally, the stroller body can be controlled in the unfolded state merely by arresting the main rod of the collapsible stand and each lower rod on the stop portions of the buckling means.

What is claimed is:

1. A safety buckling structure of a baby stroller, comprising a stroller body which has a plurality of front-wheel rods and a plurality of rear-wheel rods connected pivotally together, a collapsible stand being provided between the rear-wheel rods, the collapsible stand having a main joint, the bottom end of which has middle rods pivotally connected at two sides respectively, a main rod being inserted at the central portion of the main joint, two upper rods stretching out laterally to respective sides being pivotally connected at the top end of the main rod, the other end of the upper rods being pivotally connected respectively to the corresponding rear-wheel rods, two lower rods stretching out laterally to respective sides being also pivotally connected at the bottom end of the main rod, and the other end of each middle rod being pivotally connected to the other end of the corresponding lower rods, a buckling means being pivotally connected at the pivot of both the main rod and the lower rods, the buckling means having a binding screw which is inserted with an elastic member, the main rod of the collapsible stand being inserted and installed in the buckling means and the lower rods being inserted and installed at both sides respectively of the buckling means, and stop portions with respect to the main rod and the lower rods being formed at the bottom end of the buckling means.

2. A safety buckling structure of baby stroller as claimed in claim 1, wherein each said front-wheel rod has a front-wheel rod joint.

3. A safety buckling structure of baby stroller as claimed in claim 1, wherein an intersection frame is pivotally connected among said front-wheel rods and said rear-wheel rods.

4. A safety buckling structure of baby stroller as claimed in claim 1, wherein said front-wheel rods are pivotally connected with lateral rods, the other ends of which are pivotally connected to the corresponding rear-wheel rods respectively.

5. A safety buckling structure of baby stroller as claimed in claim 1, wherein said buckling means is formed with a female joint portion and a binding screw is inserted through the female joint portion.

6. A safety buckling structure of baby stroller as claimed in claim 1, wherein said elastic member is clamped between said binding screw and said female joint portion.

7. A safety buckling structure of baby stroller as claimed in claim 1, wherein said buckling means is formed with through groove in which said main rod of the collapsible stand is inserted and fixed therein.

8. A safety buckling structure of baby stroller as claimed in claim 1, wherein said buckling means is formed with lateral grooves in which the lower rods of said collapsible stand are inserted and fixed respectively therein.

9. A safety buckling structure of baby stroller as claimed in claim 1, wherein an outer thread portion is formed on said binding screw for engagement with a thread nut which is stopped at outside of said main rod and said lower rods.

10. A safety buckling structure of baby stroller as claimed in claim 1, wherein said buckling means is formed with a force-applying portion.

11. A safety buckling structure of baby stroller as claimed in claim 1, wherein a hole with respect to said binding screw is provided on said buckling means.

* * * * *